United States Patent
Witt et al.

(10) Patent No.: US 7,886,161 B2
(45) Date of Patent: Feb. 8, 2011

(54) METHOD AND SYSTEM FOR INTERCEPTING TRANSACTIONS FOR ENCRYPTION

(75) Inventors: Russell A. Witt, Plano, TX (US);
Timothy R. Bruce, Carrollton, TX (US);
David L. Helsey, Glastonbury, CT (US);
Osvaldo A. Ridner, Folsom, TX (US);
John M. Casey, Carrollton, TX (US)

(73) Assignee: Computer Associates Think, Inc., Islandia, NY (US)

( * ) Notice: Subject to any disclaimer, the term of this patent is extended or adjusted under 35 U.S.C. 154(b) by 884 days.

(21) Appl. No.: 11/558,252

(22) Filed: Nov. 9, 2006

(65) Prior Publication Data

US 2007/0112677 A1    May 17, 2007

Related U.S. Application Data

(60) Provisional application No. 60/735,531, filed on Nov. 11, 2005.

(51) Int. Cl.
*G06F 11/30* (2006.01)
*G06F 12/14* (2006.01)
*G06F 21/00* (2006.01)

(52) U.S. Cl. .................................. 713/193; 705/50
(58) Field of Classification Search ................. 713/193; 705/50
See application file for complete search history.

(56) References Cited

U.S. PATENT DOCUMENTS

| 5,007,082 | A | * | 4/1991 | Cummins ................... 713/164 |
| 5,677,952 | A | * | 10/1997 | Blakley et al. ............... 713/189 |
| 6,453,277 | B1 | * | 9/2002 | Helsey et al. ................. 703/24 |
| 6,986,009 | B1 | | 1/2006 | Lecrone et al. ............. 711/162 |
| 2003/0065903 | A1 | * | 4/2003 | Ashton et al. ............... 711/172 |
| 2005/0091487 | A1 | * | 4/2005 | Cross et al. .................. 713/165 |

* cited by examiner

*Primary Examiner*—Kambiz Zand
*Assistant Examiner*—Aubrey H Wyszynski
(74) *Attorney, Agent, or Firm*—Baker Botts L.L.P.

(57) ABSTRACT

The present invention is directed to a method and system for intercepting transactions for encryption. In accordance with a particular embodiment of the present invention, an application for a storage device is monitored. A transaction for the storage device is intercepted. An encryption request within the transaction is identified. Performance of the transaction is emulated by performing the encryption request in a predetermined exit point of the application.

21 Claims, 2 Drawing Sheets

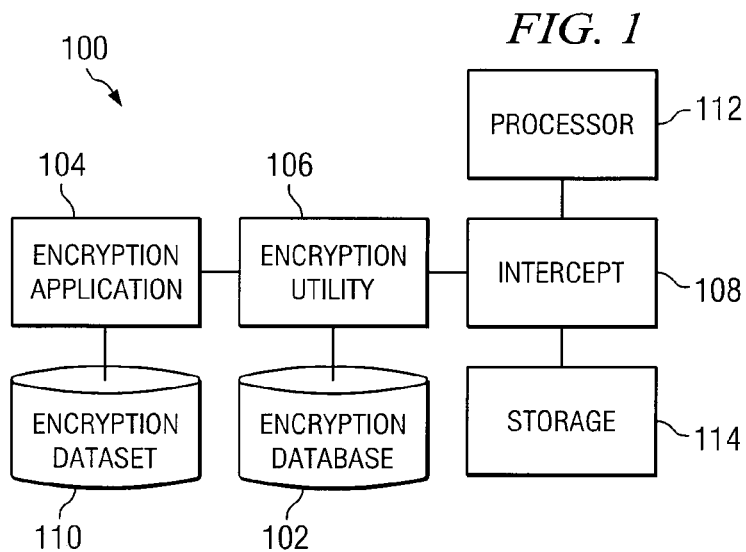
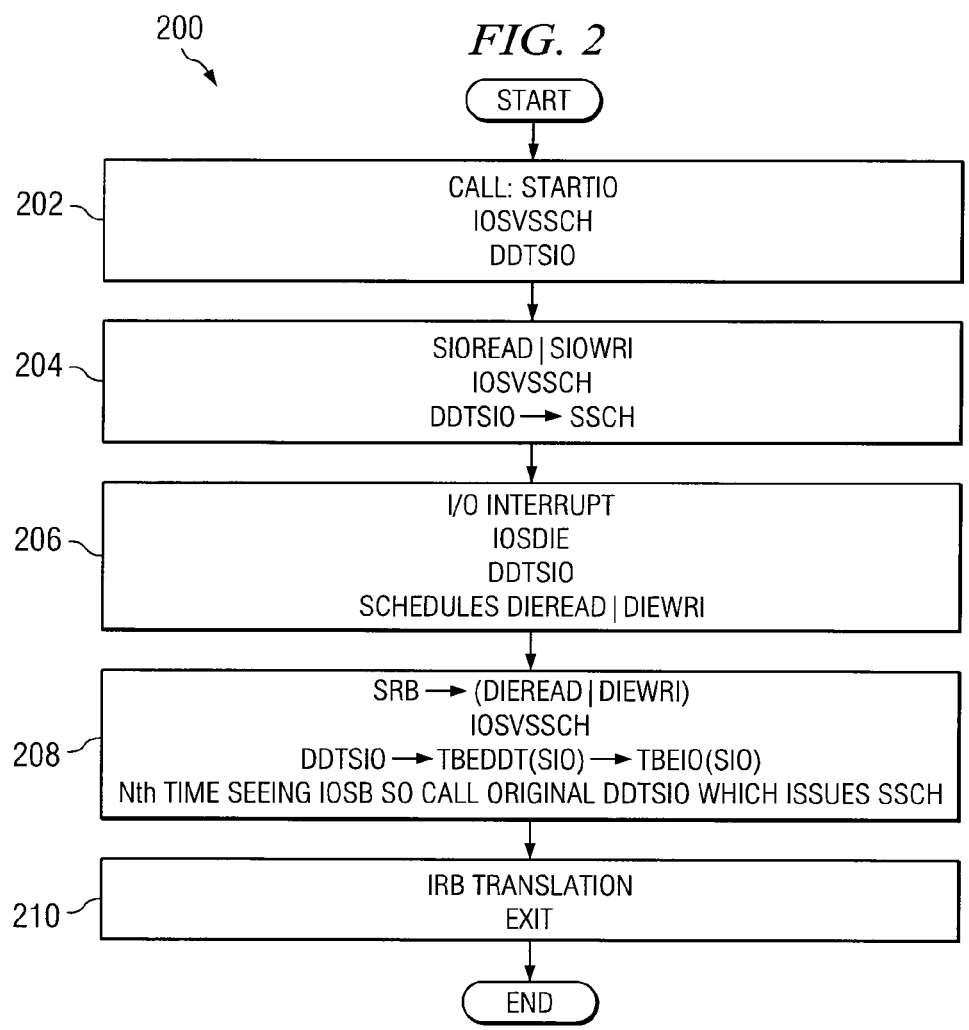

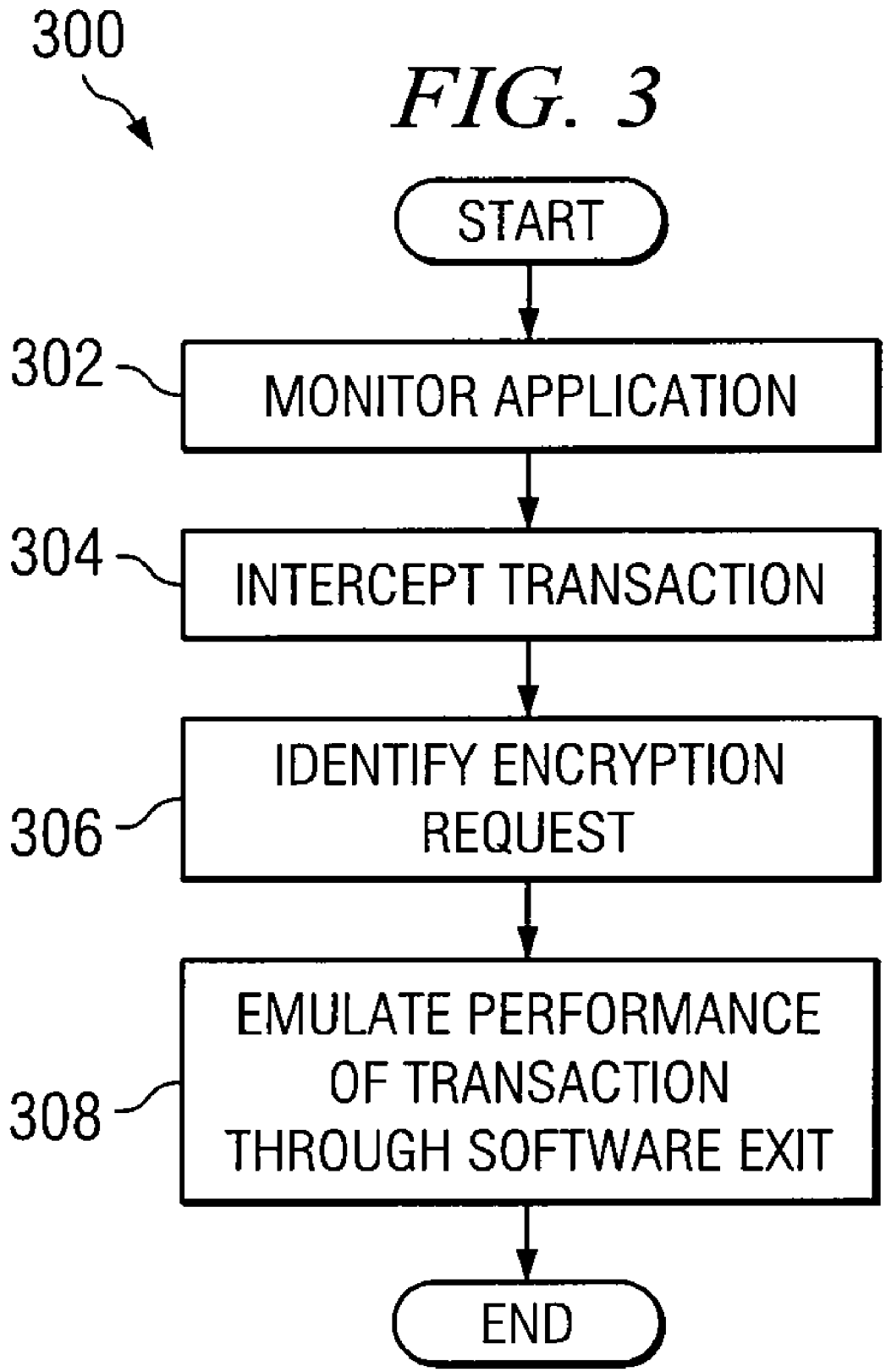

METHOD AND SYSTEM FOR INTERCEPTING TRANSACTIONS FOR ENCRYPTION

CROSS-REFERENCE TO RELATED APPLICATIONS

This application claims the benefit of priority under 35 U.S.C. §119(e) of U.S. Provisional Application Ser. No. 60/735,531 filed Nov. 11, 2005.

TECHNICAL FIELD

The present disclosure relates generally to data encryption, and more particularly to a method and system for intercepting transactions for encryption.

BACKGROUND OF THE INVENTION

Conventional mainframe systems often store large volumes of data on tapes. Tapes may be used for archival purposes as well as a primary storage medium for some mainframe systems. Lost or stolen tapes in transit between data centers and their off-site storage facilities may lead to losses that compromise personal and private data of individuals. Because of the critical and potentially devastating loss of this highly sensitive information, these losses could expose organizations to a wide range of hardships, including fraud and identify theft.

It is therefore desirable to encrypt tape data at a data center. Numerous attempts to create an easy-to-use mechanism to encrypt tape data, however, have significant limitations. For example, hardware products require that every site that must read encrypted tapes have the same hardware as the site that encrypted the tapes. Thus, trading partners would be required to have the same solution and the same hardware requirements.

Other products, such as software products, may allow data to be copied from tape to another tape in an encrypted form. So, if an application writes a two-volume tape file, then the application can copy that file (or files) to another two-volume tape file in an encrypted form. Then, to read the data, the encrypted two-volume tape file has to be re-copied and un-encrypted back onto a two-volume tape file that is not encrypted. Then, the application can read the un-encrypted two-volume tape file as input. This means writing the data twice and reading the data twice, as well as keeping track of the file name and relationship between the original data, the encrypted copy, and the un-encrypted copy.

SUMMARY OF THE INVENTION

The present invention is related to a method and system for intercepting transactions for encryption. The teachings of the present invention allow data to be encrypted in a manageable manner.

In accordance with a particular embodiment of the present invention, a method for intercepting transactions for encryption includes monitoring an application for a storage device. The method also includes intercepting a transaction for the storage device. The method further includes identifying an encryption request within the transaction. The method further includes emulating performance of the transaction by performing the encryption request in a predetermined exit point defined by the application.

Technical advantages of particular embodiments of the present invention include a system and method for intercepting transactions that works at the device level to encrypt and decrypt tape data. Thus, any application may instantly begin generating encrypted tapes without modifying the application. In addition, many sites and trading partners may participate in the exchange of encrypted data without purchasing new or additional hardware or software.

Further technical advantages of particular embodiments of the present invention include a system and method for intercepting transactions that enables low level intercepts to a tape device. Thus, software is used to control what is received prior to starting an input transaction and after the output interruption transaction completes from a device.

Other technical advantages of the present invention will be readily apparent to one skilled in the art from the following figures, descriptions, and claims. Moreover, while specific advantages have been enumerated above, various embodiments may include all, some, or none of the enumerated advantages.

BRIEF DESCRIPTION OF THE DRAWINGS

For a more complete understanding of the present invention and its features and advantages, reference is now made to the following description, taken in conjunction with the accompanying drawings, in which:

FIG. 1 is a block diagram illustrating a system for intercepting transactions according to the teachings of the present invention;

FIG. 2 is a flow diagram illustrating a method for intercepting a transaction at a software exit point, according to one embodiment of the present invention; and FIG. 3 is a flow diagram illustrating a method for intercepting transactions, according to one embodiment of the present invention.

DETAILED DESCRIPTION OF THE INVENTION

Storage management has generally referred to managing data on tape and disk devices. Data on tape may be lost, for example, either while at a disaster recovery organization or in transit from one data center to another. While tapes may be lost in transit, or misplaced and misfiled at disaster recovery sites, recent changes in laws require public disclosure when lost data might be related to individual financial or medical information. This public disclosure requirement has forced many companies to attempt to better protect all data that is not stored in a secure data center.

On a mainframe, tapes may be used for both backup or disaster-recovery purposes. Tapes may be also be used for other purposes. While some specific products (for example, with respect to backup products) have started to address encryption for these purposes, they are often less than ideal. Data centers need the ability to have any application that writes data on tape to have the data encrypted without regard for the application writing the data. And, since one of the reasons for putting the data on tape is the easy portability of the media (to be able to write it on one tape at one data center, ship it to another data center, and be very sure that there will be a device capable of reading the tape), it is preferable that the encryption process is not limited to one type of tape device that may or may not be available at all other data centers. What is needed is a system that allows any application that writes tape data to a device to have an intercept at a low level that gets control of all I/O transactions to determine if the data needs to be encrypted and encrypt the data if necessary, without regard for the application writing the data and without regard for the type of tape device being written to.

In accordance with the teachings of the present invention, a method for intercepting transactions to a device for purposes of encryption in a mainframe environment includes units of work presented for execution on one of multiple central processing units. The units of work can operate in a state that is enabled or disabled for interrupts, and in task or service request mode. Low level intercepts to a tape device may then control what is received prior to starting an input transaction and after an output transaction completes from a device.

Upon obtaining control, the original transaction caller may believe a transaction took place within the caller's buffer space in a general storage area on board the mainframe, but it is actually a transaction from a different buffer space where the data has been encrypted or decrypted. For example, control may be received in an intercept, such as an exit point defined by the application, during an input/output (I/O) transaction initiation to encrypt data or during I/O transaction completion to decrypt data. The operating state of the central processing unit when control is received is in a restricted mode which is prohibited when calling encryption services. If cryptography services are required, a service request is queued and the transaction is left in a suspended state, otherwise the I/O transaction proceeds unsuspended. When the service request gains control it is operating in a central processing unit state able to call cryptography services. For write operations, calls to cryptography services encrypt data from the caller's buffer into an encrypted buffer, then the I/O transaction resumes. For read operations, calls to cryptography services decrypt data from an encrypted buffer into the caller's buffer, then the I/O transaction resumes.

The method and system for intercepting transactions identified in this invention are not limited to any specific mainframe system. The examples illustrated in the accompanying figures will be described with reference to mainframes running IBM's zSeries/Operating System (z/OS). However, other well-known operating systems, including future operating systems may also be used. Additional information regarding I/O emulation is available within U.S. Pat. No. 6,453,277 (the "'277 patent").

FIG. 1 is a block diagram illustrating a system 100 for intercepting transactions for encryption according to the teachings of the present invention. System 100 generally includes an encryption database 102, an encryption application 104, an encryption utility 106, an intercept 108, an encryption dataset 110, a processor 112, and a storage device 114. Preferably, encryption database 102 is operable to handle the merging and separating of data centers by employing a key table structure. In a simple environment there is one key table with a default name. This one table is the primary table and is used for all encryptions performed in the data center. If two data centers merge, the key table is exported from one system and imported into the other system. The imported key table is referenced for decrypting tapes that were merged into the data center. The original key table is the primary table and any new encrypting is done based on the original key table. Thus, each key table can contain a key with the same key name, but whose encryption key is different.

In this embodiment, a control block is built for each tape Unit Control Block (UCB) the first time that unit is actually used. The encryption control block is built and chained to the other encryption control blocks by the dynamically-installed intercept 108 as described in greater detail below. The Unit Control Block is updated to indicate if encryption/decryption services are required or not. This way, intercept 108 that receives control for every I/O transaction to the device will require a few instructions to obtain this control block (from its anchor point in the UCB itself) and determine if its services are required or not. If not, then the I/O transaction will be able to continue with minimal instruction path impact. If encryption/decryption services are required, then intercept 108 issues the calls to encryption application 104 to actually perform the encryption or decryption and allow the I/O transaction to complete and save any stats in the control block as it progresses.

According to one embodiment of the invention, encryption utility 106 may take any stats and update the encryption database 102 as necessary. The encryption utility 106 also acts as an interface between intercept 108 and encryption application 104 and may also have an online interface to allow the creation and maintenance of the encryption database.

According to one embodiment of the invention, encryption application 104 may generate an encryption key using a pass phrase, and an encryption key label is generated to be associated with the encryption key in an encryption dataset 110. System 100 then passes the encryption key or some derivation back to the encryption application 104 as an encryption/decryption key and gets it converted to an internal encryption token. Encryption application 104 may also called to store the internal token in the encryption dataset 110 using the key label as the record's "handle." The system preferably does this multiple times with the same encryption key (e.g., once for each of the different types of encryption that is supported).

Processor 112 may refer to any suitable device operable to execute instructions and manipulate data to perform operations for system 100. Processor 112 may include, for example, any type of central processing unit (CPU). In particular embodiments of the present invention, processor 112 may operate as one of the main processors on a mainframe system running z/OS.

Storage device 114 may refer to any suitable device operable for storing data and instructions. Storage device 114 may include, for example, a magnetic disk, flash memory, or optical disk, or other suitable data storage device. In particular embodiments of the present invention, storage device 114 may be a tape device on a mainframe system running z/OS.

According to one embodiment of operation, intercept 108 gets control of an I/O transaction between processor 112 and storage device 114 when a new file is to be created or read. Intercept 108 may refer to any suitable logic operable to control transactions through any suitable mechanism, such as a software exit point. Then a decision based on information corresponding to the data set being created may be used to determine if the file should be encrypted or decrypted and what encryption method should be used. An OPEN process, for example, may perform setup functions for the subsequent encryption of the data to follow. During OPEN, intercept 108 may query the system to determine if encryption is desired, and if encryption is desired what type of encryption is desired. For example, a descriptor field might contain something like "CYPHER=(keyname,AES128)". This would indicate that encryption is desired, the key name specified should be used, and the type of encryption desired is AES 128-bit encryption.

If encryption is to be performed, then encryption utility 106 calls encryption application 104 to retrieve the internal token. Encryption application 104 may return the key table, the key name, the key ID and the token to be used. The OPEN process with intercept 108 may then acquire the buffer(s) needed for encryption and updates an encryption control block containing pointer(s) to the buffers(s), the internal token to be used in the encryption process, and any other pertinent information required by the encryption process. Also, encryption utility 106 may update the statistics for the key name to reflect another usage of this key. The key table, key name, key ID, and other information may be passed to update the statistics. Tape devices may store the key ID in their respective databases.

In addition, the encryption control block may also be updated. An anchor to all control blocks is maintained. If this is the first time this specific Unit is being used, a new control block is built and added to the chain. Otherwise, the existing control block is being re-used. Once the control block has been found or created; it will also be anchored in the Unit Control Block extension itself. This allows the I/O intercept to find the control block quickly and easily. If a "retired key" is selected however, the job may be failed or a request may be issued asking for the correct key name to be used.

According to one embodiment with respect to tape I/O output transactions, system 100 traps the data before it gets written, encrypts it, and then causes the encrypted data to be written to storage device 114. The encryption system may intercept the WRITE event using intercept 108 in Start I/O (SIO) processing. The system finds the control block built by OPEN and verifies the buffers are adequate for processing this channel program. If not, then new buffers are added to the buffer pool for this file. Each write event is updated with a corresponding address in a corresponding encryption buffer. For each complete block processed, the encryption application is invoked to encrypt the data into the corresponding encryption buffer. When the end of the write event is found, the SIO is re-driven with the updated encrypted buffer. Encryption buffers that have been used are marked as being in use. When the I/O transaction completes, the system trap then marks the buffers as no longer in use. This allows for the unpredictable I/O logic of certain utilities.

According to one embodiment with respect to tape I/O input transactions, system 100 traps the data after it gets read from storage device 114, decrypts it, and then passes the decrypted data back to the reader. The system may catch the READ event intercept 108 in SIO processing. The system finds the control block built by OPEN and verifies the buffers are adequate for processing this channel program. If not, then new buffers are added to the buffer pool for this file. Each READ event is updated with a corresponding address in a corresponding encryption buffer. When the end of the channel program is found, the SIO is re-driven with the channel program pointing to the encryption buffers. Encryption buffers that have been used are marked as being in use. When the I/O transaction completes, the system trap processes the blocks just read. For each complete block read, the encryption application decryption service is invoked to decrypt the data into the caller's original buffers. The system then marks the encryption buffers as no longer in use. This allows for the unpredictable I/O logic of certain utilities.

Thus, example embodiments of the present invention provide tape data encryption by enabling low level intercepts to a tape device, controlling what is received prior to starting an input transaction and after the output transaction completes from a device. It is preferable that the encryption system make a quick determination as to whether or not it must participate in the processing of file information at the Start I/O level (SIO). Also, when the encryption system determines that it must participate, it must also quickly determine the information required by that participation. Further, it is preferable that an I/O caller believe a transaction took place within the caller's buffer space in a general storage area on board the mainframe, when it is actually a transaction from a different buffer space controlled by the intercepting system where the data has been encrypted or decrypted.

FIG. 2 is a flow diagram illustrating a method 200 for intercepting a transaction in a software exit point, according to one embodiment of the present invention. As an introduction, a typical mainframe conducts a very large amount of I/O. To facilitate this, up to 256 I/O channels may exist. Each I/O channel is identified by a channel path identifier (CHPID). Each I/O device, will have a unit control block (UCB) defined within the common address space of the general storage unit. The UCB also retains a pointer to an I/O queue (IOQ) and an I/O supervisor block (IOSB) which points to blocks of channel command words (CCW) that define the I/O transaction to be conducted. A channel program may be created with one or more CCWs. In various embodiments, the CCWs may be chained together to be completed in a contiguous order or may be split using a transfer channel command.

According to one embodiment of the present invention, batches of 256 CCWs may be completed in one I/O transaction at a time. The CCWs may be located in a caller's address space for a particular I/O transaction. The caller's address space may apply to several devices at any given moment. The CCWs from the caller's address space may be copied into an intercepting system's address space, and the caller's address space may be used to anchor various operations to emulate the I/O.

In various embodiments, a pointer (IRBCBWAD) may be used to maintain the position of the last CCW. A translation may be required to translate an original channel program with many splits to a contiguous ordered list of CCWs. The translation may be stored in a translation table with various control blocks, where the buffer starts, where the data is located, the original address of the original CCW, or any other suitable information for creating a suitable channel program based on an original channel program.

According to one embodiment of the present invention, a limit may be set for the number of CCWs executed in an I/O transaction at a time. For example, if the limit is set too low, for example 128 CCWs, the I/O transaction may be too slow. As another example, if the limit is set too high, for example 512 CCWs, the storage space required may be too large. Accordingly, it may therefore be preferable to have limit the number of CCWs to 256 per I/O transaction.

According to one embodiment of the present invention, various control blocks may be implemented to control an address space buffer. For example, an I/O asid control block (IOA) may be used to control I/O addresses. As another example, an I/O home asid control block (IOH) may manage an address to an IOA, but is stored in private storage of the caller's address space. As another example, an I/O buffer control block (IOB) may manage cells whose anchors reside in an IOA. Thus, the control blocks may be used to manage and access an address space buffer.

The method begins at step 202 where in a typical I/O transaction, an application will attempt to open a file and attempt to gain access to a STARTIO macro. The STARTIO macro gets an IOQ which points to a particular IOSB, and queues it on the UCB, which represents a tape device. It will then call a start sub-channel process (IOSVSSCH), which is what starts the receive process to receive all the CCWs for the actual device. IOSVSSCH may first attempt to determine, based on an IOQ/IOSB pair, if the device is in a state to receive new I/O. If not, then it may be put on hold, and be re-executed repeatedly until the device is ready. If the device is ready, then IOSVSSCH calls a device descriptor table which holds the start I/O software exit(DDTSIO) point, which is hooked by the present method. Next, it may be determined whether this is the first time the system has seen the particular IOSB. If it is the first time and it is desired to intercept the IOSB for encryption, an SIOREAD or an SIO- WRITE may be scheduled (depending on whether the CCW is a read or a write) by issuing a service request block (SRB).

After a CPU dispatches the SIOREAD or SIOWRITE SRB, at step 204 the SIOREAD OR SIOWRITE may be executed. An SIOREAD may include getting an owning IOB for the IOSB, hooking the IOSB exits, copying the channel program, and restarting IOSVSSCH. An SIOWRITE may include getting an owning IOB for the IOSB, hooking the IOSB exits, copying the channel program, encrypting the data and restarting IOSVSSCH. Next, DDTSIO may get control, but since this is the second time that the system sees the IOSB, DDTSIO may issue a start sub-channel (SSCH) to the device's SID.

After the device services the I/O, at step 206, after the I/O is complete (I/O Interrupt), an IOSDIE process returns a return code that indicates I/O complete or instruct IOS if another I/O is ready to execute, and may schedule an DIEREAD or a DIEWRITE using DDTSIO. A DIEREAD may include locating the IOB, performing a translate for the CCWs, decrypting the data, fixing up the IOSB, and hooking back to re-drive STARTIO. A DIEWRITE may include locating the IOB, performing a translate for the CCWs, fixing up the IOSB, and hooking back to re-drive STARTIO. The DIEREAD or DIEWRITE may be scheduled based on an interrupt handler by issuing a service request block (SRB).

After a CPU dispatches the DIEREAD or DIEWRITE SRB, at step 208, SRB gets control to execute the SRB. IOVSSCH may be issued once again, and the DDTSIO may see that this is the Nth time seeing the particular IOSB so the original DDSTIO may be called which issued the SSCH. At step 210 the IOSB may be touched up for a final time with an IRB translation, and allows the process to finish. It should be understood that some of the steps illustrated in FIG. 2 may be combined, modified or deleted where appropriate, and additional steps may also be added to the flowchart. Additionally, as indicated above, steps may be performed in any suitable order without departing from the scope of the invention.

FIG. 3 is a flow diagram illustrating a method for distributing software components, according to an embodiment of the present invention. The method begins at step 302 where an application for a storage device is monitored. At step 304, a transaction for the storage device is intercepted. At step 306 an encryption request within the transaction is identified. The encryption request may be an encryption or decryption service request depending on whether the transaction is a read transaction or a write transaction. At step 308, the performance of the transaction is emulated by performing the encryption request in a predetermined software exit point defined by the application. Thus, the transaction processing at the exit point defined by the application in the method of FIG. 3 is designed to cause the I/O caller to believe a transaction took place within the caller's buffer space in a general storage area on board the mainframe when it is actually a transaction from a different buffer space owned by the encryption software where the data has been encrypted or decrypted.

It should be understood that some of the steps illustrated in FIG. 3 may be combined, modified or deleted where appropriate, and additional steps may also be added to the flowchart. Additionally, as indicated above, steps may be performed in any suitable order without departing from the scope of the invention.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for intercepting transactions for encryption, comprising:
   monitoring communication between an application and a storage device;
   intercepting a transaction between the application and the storage device;
   identifying an encryption request within the transaction; and
   emulating performance of the transaction by the application, the emulation comprising:
   performing the encryption request in a predetermined exit point defined by the application;
   performing the transaction within an encryption buffer space operable to communicate with a caller buffer space allocated to the application; and
   appearing to the application that the transaction took place within the caller buffer space.

2. The method of claim 1, wherein the transaction is a write transaction, and wherein the encryption request is an encrypt data request.

3. The method of claim 1, wherein the transaction is a read transaction, and the encryption request is a decrypt data request.

4. The method of claim 1, further comprising allocating an encryption buffer space based on a caller buffer space allocated to the application.

5. The method of claim 4, wherein emulating performance of the transaction by performing the encryption request in a predetermined exit point defined by the application comprises decrypting data from the encryption buffer space into the caller buffer space.

6. The method of claim 4, wherein emulating performance of the transaction by performing the encryption request in a predetermined exit point defined by the application comprises encrypting data from the caller buffer space into the encrypted buffer space.

7. The method of claim 1, wherein identifying an encryption request within the transaction comprises accessing a unit control block (UCB), the UCB comprising a pointer to an I/O queue (IOQ), the IOQ comprising a pointer to an I/O supervisor block (IOSB) that points to one or more channel command words (CCW) that define the transaction.

8. A system for intercepting transactions for encryption, comprising:
   a storage device; and
   a processor, the processor operable to execute a program of instructions operable to:
   monitor communication between an application and a storage device;
   intercept a transaction between the application and the storage device;
   identify an encryption request within the transaction; and
   emulate performance of the transaction by the application, the emulation comprising:
   performing the encryption request in a predetermined exit point defined by the application;
   performing the transaction within an encryption buffer space operable to communicate with a caller buffer space allocated to the application; and
   appearing to the application that the transaction took place within the caller buffer space.

9. The system of claim 8, wherein the transaction is a write transaction, and wherein the encryption request is an encrypt data request.

10. The system of claim 8, wherein the transaction is a read transaction, and the encryption request is a decrypt data request.

11. The system of claim 8, wherein the program of instructions is further operable to allocate an encryption buffer space based on a caller buffer space allocated to the application.

12. The system of claim 11, wherein the program of instructions is further operable to decrypt data from the encryption buffer space into the caller buffer space.

13. The system of claim 11, wherein the program of instructions is further operable to encrypt data from the caller buffer space into the encrypted buffer space.

14. The system of claim 8, wherein the program of instructions is further operable to access a unit control block (UCB), the UCB comprising a pointer to an I/O queue (IOQ), the IOQ comprising a pointer to an I/O supervisor block (IOSB) that points to one or more channel command words (CCW) that define the transaction.

15. Logic encoded in non-transitory media, the logic being operable, when executed on a processor, to:

monitor communication between an application and a storage device;

intercept a transaction between the application and the storage device;

identify an encryption request within the transaction; and emulate performance of the transaction by the application, the emulation comprising:

performing the encryption request in a predetermined exit point defined by the Application;

performing the transaction within an encryption buffer space operable to communicate with a caller buffer space allocated to the application; and appearing to the application that the transaction took place within the caller buffer space.

16. The logic of claim 15, wherein the transaction is a write transaction, and wherein the encryption request is an encrypt data request.

17. The logic of claim 15, wherein the transaction is a read transaction, and the encryption request is a decrypt data request.

18. The logic of claim 15, wherein the logic is further operable to allocate an encryption buffer space based on a caller buffer space allocated to the application.

19. The logic of claim 18, wherein the logic is further operable to decrypt data from the encryption buffer space into the caller buffer space.

20. The logic of claim 18, wherein the logic is further operable to encrypt data from the caller buffer space into the encrypted buffer space.

21. The logic of claim 15, wherein the logic is further operable to access a unit control block (UCB), the UCB comprising a pointer to an I/O queue (IOQ), the IOQ comprising a pointer to an I/O supervisor block (IOSB) that points to one or more channel command words (CCW) that define the transaction.

\* \* \* \* \*